Aug. 25, 1959  S. ROSNER ET AL  2,901,003
SOLID HEAD TUBULAR CONNECTOR AND METHOD OF MAKING SAME
Filed Nov. 1, 1956

INVENTOR.
SAUL ROSNER
BY  FRED HELLER
ATTORNEY

2,901,003

SOLID HEAD TUBULAR CONNECTOR AND METHOD OF MAKING SAME

Saul Rosner, Norwalk, and Fred Heller, Stamford, Conn., assignors to Burndy Corporation, a corporation of New York Application November 1, 1956, Serial No. 619,793

6 Claims. (Cl. 138—89)

Our invention relates to connectors made from tubing and provided with an inner solid head forming a plurality of compartments, and to methods of making the same. Solid head connectors are useful for oil sealing between two conductors, and as a corrosion barrier between dissimilar conductors.

Previously, such connectors have been made by casting the connector into the desired form, or by using tubular material, and centering plugs therein which were force-fitted or brazed to form a seal. Both methods are expensive, and the latter requires different size plugs for different size connectors.

It is an object of our invention to take a tubing having the desired inner diameter for accommodating a conductor therein, and by the cold flow of metal, form a solid head in the desired position.

These and other objects of the invention are accomplished and new results obtained as will be apparent from the device described in the following specification, particularly pointed out in the claims, and illustrated in the accompanying drawing, in which:

Figure 1:
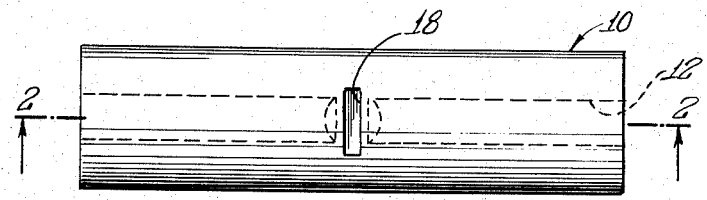
Fig. 1 is a top view of a connector made in accordance with the invention.

We have found that certain thicknesses of tubing having the smaller range of diameters may be directly lanced to form a solid head. For example, the aluminum tube 10, Fig. 1 of the drawing, possesses a diameter of 1", with a ⅜" bore 12. A rectangular lance or punch 14, having cross-sectional dimensions of approximately ½" x ⅛" may be oppositely projected through the wall 16 of the tube, for a distance approximately equal to the wall thickness, namely for 5/16", forming a recess 18, and displacing the metal from recess 18 inwardly to contact the metal displaced from the opposite side. The displaced metal is assisted in flowing inwardly by confining the tube 10 circumferentially about its external surface by means of dies 20. The contacting displaced metal will be compacted forming a solid barrier 22 suitable for sealing purposes. The minimum thickness of the barrier for the dimensions given, is ¼", which is sufficient to take substantial pressures, if necessary.

Figure 2:
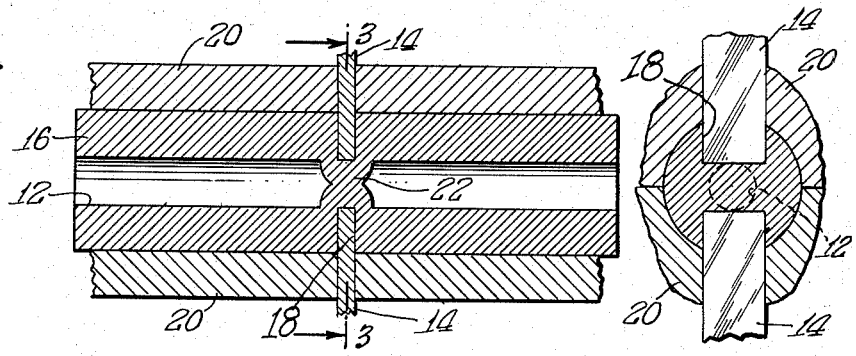
Fig. 2 is a longitudinal sectional view taken along the plane 2—2 of Fig. 1 with lance added.
Figures 3, 4:
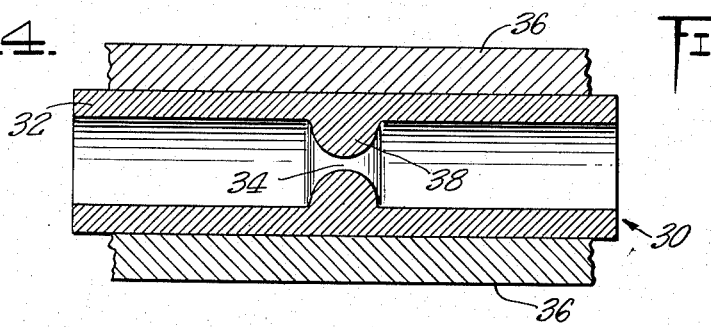
Fig. 3 is a transverse sectional view taken along lines 3—3 of Fig. 2.
Fig. 4 is a sectional view of a piece of tubing that has been thickened at the center by the heading process, and the headed portion inwardly directed.
Figure 5:
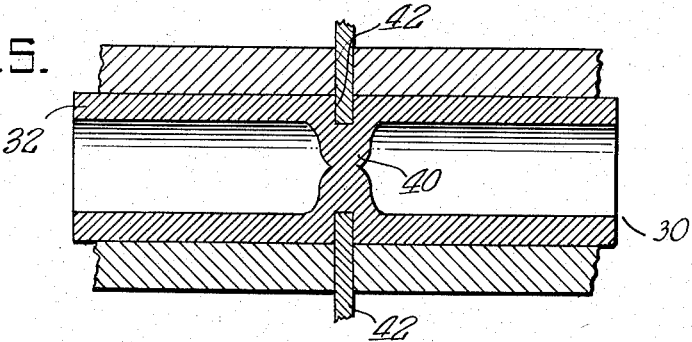
Fig. 5 is a sectional view of the same tubing wherein the solid head is formed by lancing.

If the tubing is too thin to provide sufficient directly displaced metal to form a satisfactory barrier across its inner diameter, i.e., if the critical wall thickness is one-half or less of the inside diameter of the tube, we have found that the heading process may be used to accumulate sufficient metal at the desired position for this purpose. Thus, in Fig. 4, we illustrate the tubing 30 provided with a wall 32 that has been upset at 34 by the heading process, and inwardly displaced by the outer die 36 to form an annular bead 38. In certain sizes the displaced inner ridge may form a solid head. If not, a lance of suitable dimension may be used, as is shown in Fig. 2, or staking or punching the bead 38, to form the solid head 40, as is shown in Fig. 5. The additional metal displaced from the lance recesses 42 will, in such case, provide the necessary excess to form the solid head. Because heading will reduce the overall length of the tubing, compensation for the shortening must be provided for, to obtain the proper desired final length.

In each case, the displaced metal is impacted by the pressure of the opposing forces to form a solid head of denser metal than the original wall metal, and of sufficient thickness to furnish a liquid seal, an adequate resistance to pressure, and a barrier against corrosion. The recess formed by the lance serves as a guide for determining the existence of and location of the solid head therein.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which objects of our invention are attained and new results accomplished, as it is obvious that the particular embodiments herein shown and described are only some of the many that can be employed to attain these objects and accomplish these results.

We claim:

1. The method of forming a solid head in a tube, transverse to the longitudinal axis of said tube, which comprises the steps of locating said tube in a confining die, displacing the material at an area of contact within said confining die from the wall of the tube inwardly in sufficient amounts and with sufficient force to form a solid head of the desired thickness at the area of contact.

2. The method of claim 1, wherein the material in the wall is displaced by applying a lance to the original wall of the tube perpendicular to the longitudinal axis of said tube, said lance having a width greater than the inner diameter of said tube.

3. The method of claim 1, wherein the material is displaced from the inner surface of said tube by heading to form a bead on said inner surface at the area of contact.

4. The method of claim 3, wherein the bead is inwardly directed.

5. A tube having a solid head of material displaced from the walls of the tube and disposed perpendicular to the longitudinal axis of said tube, and positioned to form a seal inside the tube, the wall of the solid head being made of denser metal than the walls of the tube.

6. The metal tube of claim 5, wherein is provided a recess positioned outside the tube and adjacent the solid head, said recess having a volume substantially equal to that of the displaced material.

References Cited in the file of this patent

UNITED STATES PATENTS

| 638,554 | Burton | Dec. 5, 1899 |
| 1,686,405 | Campbell | Oct. 2, 1928 |
| 1,994,725 | Offut | Mar. 19, 1935 |
| 2,103,839 | Bardell | Dec. 28, 1937 |
| 2,554,328 | Grimes | May 22, 1951 |

FOREIGN PATENTS

| 928,929 | Germany | June 13, 1955 |